Dec. 3, 1957 M. C. POYLO 2,815,400

INFORMATION TRANSMISSION SYSTEM

Filed Oct. 13, 1955 2 Sheets-Sheet 1

INVENTOR
MICHAEL C. POYLO
BY Philip M. Bolton
ATTORNEY

Dec. 3, 1957 M. C. POYLO 2,815,400

INFORMATION TRANSMISSION SYSTEM

Filed Oct. 13, 1955 2 Sheets-Sheet 2

INVENTOR
MICHAEL C. POYLO
BY Philip M. Bolton
ATTORNEY

United States Patent Office 2,815,400

Patented Dec. 3, 1957

2,815,400

INFORMATION TRANSMISSION SYSTEM

Michael C. Poylo, New York, N. Y., assignor to International Telephone and Telegraph Corporation, Nutley, N. J., a corporation of Maryland Application October 13, 1955, Serial No. 540,231

7 Claims. (Cl. 179—2)

This invention relates to information transmission systems and particularly to systems in which lists of data are transmitted.

In transmitting data, particularly in the form of long lists, it is oftentimes found that the mails are too slow. The next most-readily available communication medium, the telephone system, has not proven satisfactory for transmitting such lists in ordinary language, due to a number of reasons which may include one or more of the following:

(1) Errors may easily creep into such transmissions;

(2) There is no record kept of what was actually transmitted even though the transmitted information was read from a list;

(3) The labor time and other costs involved in reading a long list over a telephone becomes almost prohibitive;

(4) It involves an operator at both ends throughout transmission.

Where the number of transmitter stations are many which must communicate such lists to a single receiver station, it will be apparent that the difficulties above enumerated become multiplied. For example, in some modern store chains, a single warehouse supplies merchandise to 150 stores, and each of the stores has close to a thousand items on its order list. In such a chain system, it has been found that transmitting long orders by means of telephoning is an impractical solution. A similar example is the need for rapid transmissions to a central counting station of an accumulation of votes on election day.

One seeming solution of the above problems is the use of tele-typewriters or facsimile transmission. These, however, are uneconomical partly because of the cost of the equipment plus the fact that the telephone lines have to be leased for this purpose (which equipment and lines are actually only required for a short time during each day), plus the further fact that before these machines are used a first record must be made as the orders are being made up and then these must be brought over to the machines for setting up this information on the machines. This obviously also, in addition to labor costs, introduces another possibility of error during the process of copying from the order list.

Another seeming solution of the above problem is that of directly encoding the list of orders to provide a suitable means for high speed transmission and transmitting the coded information through the ordinary telephone line, using different tone signals for this purpose. The direct encoding of an order list is difficult to do without a machine and the use of such machines is expensive and, in all likelihood, quite clumsy since they are not too portable. It also would be difficult to read back the code message to check against errors or for making changes.

An object of the present invention is the provision of a simple improved system for the communication of data, such as for example lists of items or votes to a receiving station. The system, according to the present invention, satisfies the following conditions:

(1) A coded record of the list is readily prepared without the use of a coding machine and requires no particular knowledge of codes or special skills;

(2) The coded record can also be read directly without requiring any particular knowledge or skill;

(3) The coded record is in a form suitable for high speed transmission, for example over telephone lines, and the system is suitably arranged for this purpose;

(4) The coded message is automatically recorded and converted into recorded form suitable for easy direct reading or for control of mechanisms, such as accounting machines, automatic card punching devices, etc.;

(5) After transmission, the coded message remains at the transmitter as a directly readable record;

(6) The coding while being directly legible, takes the minimum space in the direction in which successive lines are scanned. In a normal page, this would be in the vertical direction.

Other and further objects of the present invention will become apparent, and the foregoing will be better understood with reference to the following description of embodiments thereof, reference being had to the drawings, in which.

In carrying out the present invention, use is made of the fact that some of the data to be transmitted, such as for example the merchandise to be ordered or the names of the candidates on a voting record, is unchanged so that a corresponding list may be kept at both the transmitter and receiver. The variable feature, for example, the number of articles to be ordered or the candidates selected by the voter, is then the only thing required to be transmitted, with some additional information to correlate the position of the items of the list with the numbers referring to them or some code identification of each of the items. At the transmitter station, a prepared list of the items to be ordered is made, with suitable spaces to be dotted or marked adjacent the items in a decimal code, to indicate the number of said items desired or the voter's selection.

In accordance with an important feature of the present invention, the decimal code consists of a plurality of horizontal rows of spaces, each space representing a different digit in the decimal system, and the successive rows representing different orders in the decimal notations, i. e., units, tens, hundreds, etc. A sufficient number of rows is provided in association with each item to cover the maximum number of any item to be ordered. The spaces are marked, such as for example with opaque black ink or, as an alternative, are perforated, to indicate the number of each item desired. This can be readily done manually. The prepared record is then fed to a machine, which translates the markings into audible tone signals which tone signals can be transmitted by the conventional telephone system. It will be seen that a readily-readable record is maintained at the transmitter and that no coding machine is required to prepare this record.

To assure that the transmitted members are correlated with the items to which they are intended to refer, a positioning signal may be used to indicate predetermined positions along the list or tone signals may be sent representing numbers, which numbers in turn correspond to the item on the list. These positioning or identifying tone signals may be controlled by marks similar to the number marks, but which have been printed or stamped (perforated) on the record as originally prepared, that is, prior to having the numerical designations marked thereon.

At the receiver the message is recorded at high speed. The information on this record is then decoded and fed at lower speed to operate relatively slow speed devices, such as automatic printers, card punching machines and calculators. By this means, an order may be transmitted and recorded without requiring the attention of an operator at either the transmitter or receiver during the transmission process. The information transmitted is received in the form of a record enabling ready processing of the information without further conversion, such as checking the order against inventory, accumulation of sales information, etc.

Figure 1:
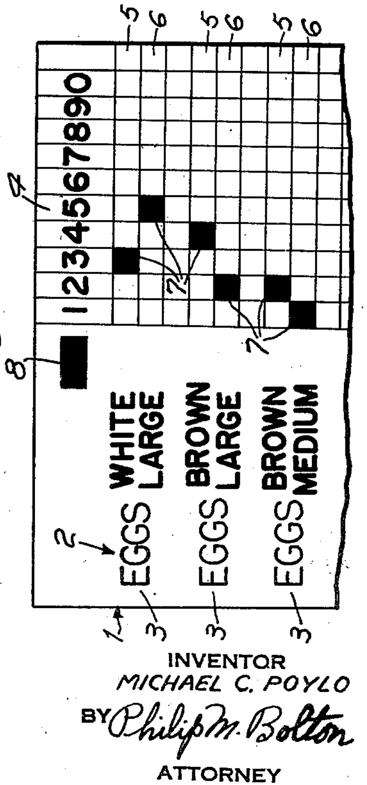
Fig. 1 is a schematic diagram of a record tape used in sending a merchandise order list and providing means for synchronizing the transmitter and receiver which communicate the information recorded on the tape.

Referring now to Fig. 1, the record tape 1 there illustrated is a sheet of paper, which is translucent so that light may pass therethrough, and has preprinted thereon a list 2 of merchandise items 3. It is marked off to provide ten columns 4, representing digits 1 through 9, and 0 in decimal notation, and opposite each of the items 3 the paper is marked off to provide two horizontal rows, 5 and 6, of which the top rows 5 are used to represent tens and the bottom rows 6 are used to represent units, in the decimal system of the item opposite which they are situated. Thus, for example opposite the designation "Eggs, white, large," the black marks 7 indicate 35 cases. In the next item, "Eggs, brown, large," the black marks indicate 42 cases, and in the next item, "Eggs, brown, medium," the black marks indicate 21 cases. The list as shown in preprinted without the black marks 7 referred to. The list, also as shown, has preprinted at predetermined points along the list, as indicated at 8, special markings which are used for positioning purposes. With the type of tape here shown, only the positioning marks and the numerical designations are transmitted. As pointed out hereinbefore, the tape is preprinted with everything thereon except the marks 7. These may be easily added with a brush or black pencil and it is this information in these marks that varies and, therefore, must be transmitted. It will be seen that this type of tape makes an excellent record of the order sent, and can be easily read and easily coded. Furthermore, the information on this tape is readily adapted for high speed transmission, as will be apparent from an examination of one system for this purpose.

Figure 2:
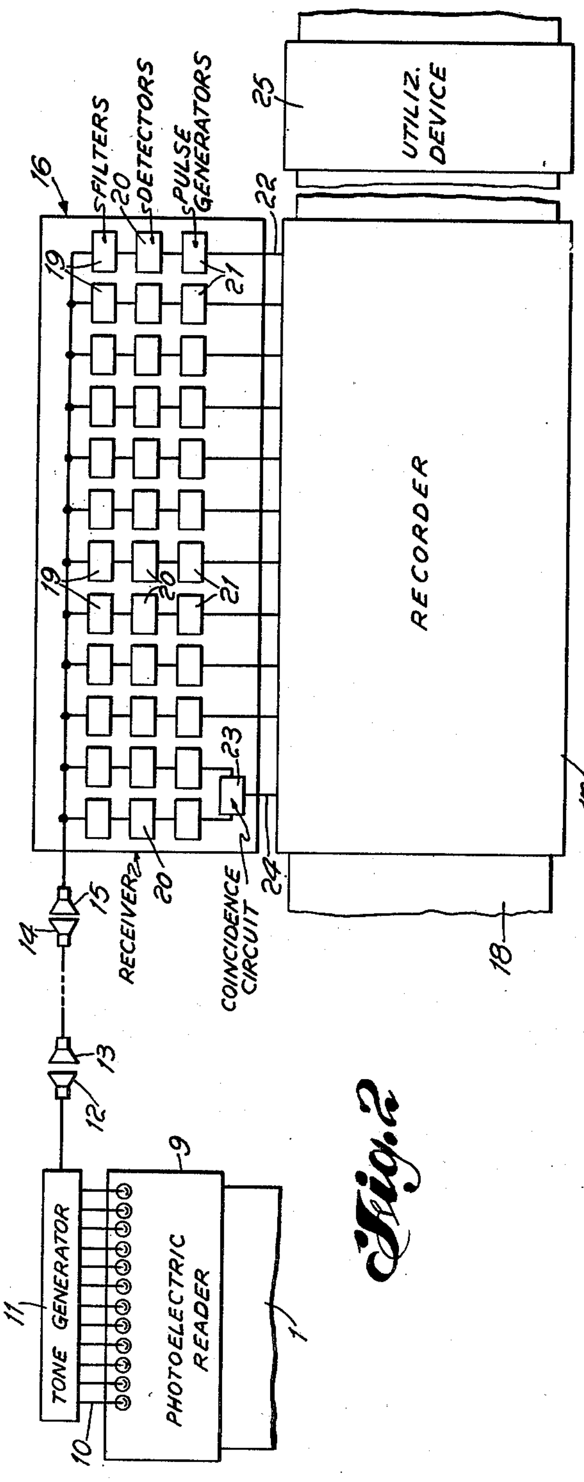
Fig. 2 is a schematic and block diagram of a transmitter and receiver system using a list such as illustrated in Fig. 1.

Referring now to Fig. 2, there is provided a photoelectric reader 9 through which the tape 1 is fed, the reader translating the black marks 7 and 8 into pulses which are fed out along a separate line 10 to a tone generator 11, which produces a different tone frequency for each input line or different group of frequencies. Thus, each tone frequency or group represents a mark 7 along a different one of the columns 4. In addition, two other distinct frequencies or groups represent the positioning mark 8, it being noted that the positioning mark 8 actually consists of two separate marks placed together and equal to twice the width of one of the marks 7. The mechanism in the photoelectric reader is obvious to anyone versed in the art and may consist, for example, of a light source fixed on one side of the tape as the tape moves through the reader, and a plurality of photoelectric cells on the other side of the tape, arranged in a row transverse to the direction of movement of the tape. Each of the photoelectric cells is focused on a separate one of the columns, covering an area equal to the size of one of the dots 7. The row of photocells will also include two photocells to cover the area of the synchronizing marks 8. When a black mark appears, light to the cell is cut off, and this produces an output pulse by obvious means, which pulse is then fed along the corresponding one of lines 10 to the tone generator 11, and produces a unique tone frequency or group in the output of the generator.

Since the ordinary telephone system is to be used as a transmission medium in communication in accordance with the present system, the tone frequencies are fed to an electroacoustic transducer 12, which may be a small loudspeaker or earphone. To initiate communication, a telephone connection is made with a receiving station in the usual telephonic way, such as by dialing or asking the operator for the desired number, and after the party at the other end indicates his equipment is ready the loudspeaker 12 is placed adjacent the microphone of the transmitter handset 13, and reading of the tape is begun by causing the tape to be moved by mechanical means (not shown) through the photoelectric reader 9. The transmitted tones from speaker 12 are then reproduced as audible tones on the handset 14 at the receiving station and translated into electric signals by a suitable microphone 15, which may be followed by preamplifiers (not shown) from whence they are fed to a receiver 16.

The receiver 16 is used to control a high speed recorder 17 which records the electrical signals on a tape 18. The receiver also sends out positioning signals to the recorder which are also recorded on the tape. This recorder may be of any suitable known high speed type, such as a magnetic or photographic recorder.

The construction of the receiver is relatively simple and obvious to anyone versed in the art. The received tone frequencies are separated by filters 19, each of whose output is detected in a separate detector 20 and fed to a pulse generator 21, to produce a pulse output, which is then fed to the recorder via lines 22, operating relays in the recorder to actuate the recording of marks on the tape 18 being fed therethrough. The positioning pulses corresponding to the positioning mark signal 8 may be fed to a coincidence circuit 23, to prevent false positioning signals being produced by noise. The output of the coincidence circuit 23 is then fed to the recorder, where it is also recorded on tape 18.

Where groups of tone signals are transmitted for each mark at the transmitter, these may be used to prevent accidental operation due to noise by separating the tone frequencies of each group, detecting and producing pulses from each tone frequency and then utilizing coincidence circuits to assure that all the desired tones are present before the mark is printed on tape 18.

The tape 18 which has been recorded at high speed may now be fed to a suitable utilization device 25 at the speed appropriate to its operation, which may be substantially lower.

Oftentimes, it is desired to totalize all the information transmitted by a number of such tapes, for example the tapes coming from different stations. For this purpose, the tape 18 may be fed out of the recorder 17 through a utilization device 25, which is a data processing machine wherein the data recorded on the tape is added to data received from other tapes or otherwise treated. The tape 18 may be marked to indicate the transmitting station from which it was received, or this information could be sent in code under the control of marks on tape 1 at the transmitter, similar to the numerical designations or similar to the positioning marks.

The utilization device 25 may also be a teleprinter which operates at relatively slow speed and may be used to print on a tape similar to tape 1 at the transmitter black marks in a decimal notation similar to those appearing on tape 1, thereby producing a replica or duplicate of tape 1. This duplicating tape is especially convenient for re-reading the original information sent.

Instead of this last-mentioned tape having all the items preprinted thereon, with the number of such items thereafter printed thereon by the teleprinter, it is also feasible to eliminate this preprinting and to obtain a tape with the numerical designations thereon corresponding to the marks 7 and the synchronizing marks 8 on tape 1. This tape could then be placed in a frame in juxtaposition with a prepared list of items 3 attached to the frame with the positioning marks opposite suitable corresponding index marks, and thus the significance of the numerical designation or marks 7 could easily be read.

This utilization device 25 could also be a converter which perforates punch cards, which punch cards in turn may be later used for recording on other forms of data processing and for automation control.

Figure 3:
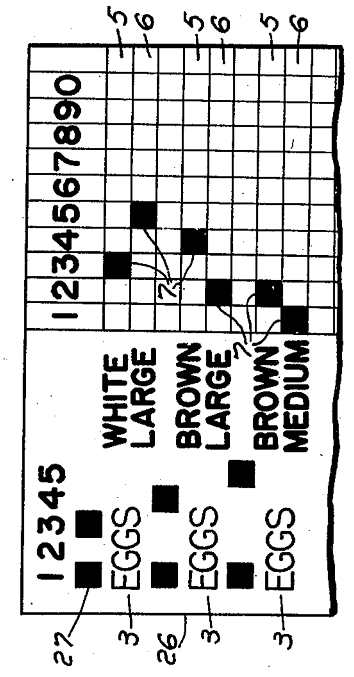
Fig. 3 is a schematic drawing of a record tape showing a modification of the tape of Fig. 1.
Figure 4:
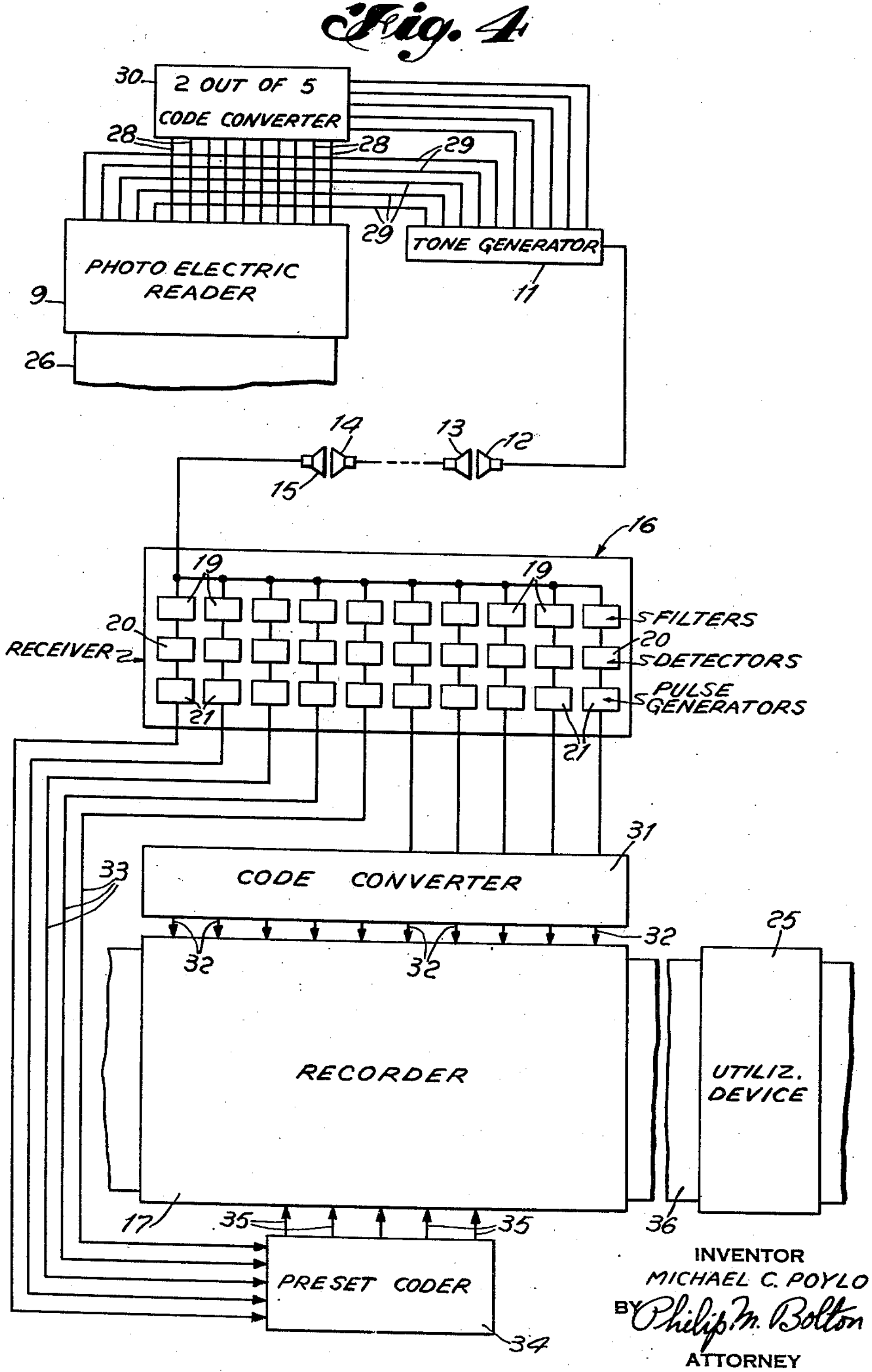
Fig. 4 is a schematic and block diagram of a transmitter and receiver system illustrating a modification of the system illustrated in Fig. 2.

In accordance with a modification of the system illustrated in Figs. 1 and 2, instead of sending synchronizing signals, signals are transmitted according to a code to identify each of the items 3 on the tape. An example of this is shown in the tape 26 of Fig. 3, which differs from tape 1 in that it has no positioning marks, but it does have designation marks 27 immediately preceding each of the items 3, each of the designation marks 27 being different and arranged according to a code, such as for example, the 2 out of 5 binary code, to identify the individual item. A tape, such as 26 of Fig. 3, may be transmitted in a system such as illustrated in Fig. 4. The tape 26 is fed through a photoelectric pickup 9, which has two different groups of output lines 28 and 29. The output lines 28 correspond to the numerical designations or marks 7 on tape 26, and indicate in decimal notation the quantity ordered, with pulses on each of the lines 28 representing a different digit. The pulses on lines 28 are fed to a code converter 30, which changes this decimal notation into a binary code notation, such as for example the 2 out of 5 binary code. The output of this converter is then fed to a tone generator, which generates tones or groups of tones according to this 2 out of 5 code, to represent the numerical designations on tape 26.

The identifying notations 27 on tape 26 produce pulses which are fed along the lines 29 directly to the tone generator 10, since they have their own coding form and do not need translation into a more efficient form of code, as is the case with the decimal notation.

The tone frequencies from generator 10 are transmitted to the receiver 16 in the manner heretofore described in connection with Fig. 1, and are separated by the filters in said receiver. Those tone signals corresponding to the numerical designations or marks 7 are fed to a code converter 31, which converts the 2 out of 5 code back to decimal notation, and feeds this out along suitable lines 32 to the recorder 17.

The receiver also feeds out, along lines 33, pulses corresponding to the identifying marks 27. Lines 33 feed these pulses to a preset coder 34, which in response to each code signal sends out a signal along lines 35, which causes the recorder 17 to record marks representing the name of the items 3. Thus, the name-identifying marks are recorded simultaneously with the related numerical designation on the receiving tape 36 and no other means for synchronization is necessary. This tape 36 may likewise be fed to a utilization device 25, as in Fig. 2, for further processing.

It will be obvious that numerous changes may be made in the system herein described. For example, instead of marking the tape in black, such tapes may be perforated and thus enable the use of mechanical readers instead of photoelectric readers, or at the receiver end the tape may be perforated, thus permitting the use of perforating printers instead of the usual type of printer. Card punching systems may be combined, both at the receiver and the transmitter, to operate into an accounting or automation system. Means for synchronizing the transmitter and receiver so as to assure proper correlation between the items and the numbers referring to them will be quite obvious, and the arrangement of the tape may be changed in various ways within the scope of the present invention.

Accordingly, while I have described above the principles of my invention in connection with specific apparatus, it is to be clearly understood that this description is made only by way of example and not as a limitation of the scope of my invention as set forth in the objects thereof and in the accompanying claims.

I claim:

1. A system of communicating between two points using the conventional telephone system as a transmission medium, the data being in the form of a list of items, comprising a record having a list of items associated with special marks for use in identifying the items, said record being adapted to be marked adjacent each item in accordance with information to be transmitted regarding said item, means for converting the informational marks and the special marks into electrical tone signals, means for converting the electrical tone signals into sound tones, means for transmitting the sound tones through the conventional telephone system, means for reconverting the received sound tones into electrical signals, a receiver record, and means for applying the electrical signals to produce corresponding marks on said receiver record.

2. A system of communicating between two points using the conventional telephone system as a transmission medium, the data being in the form of a list of items, the quantities of each item being the information required to be transmitted, comprising a record having a list of items associated with special marks for use in identifying the items, a plurality of columns on said record adjacent the items, each column representing a different digit in decimal notation, a plurality of rows on said record adjacent each item, each of said rows representing a different order in decimal notation, said record being adapted to be marked in the appropriate columns and rows to designate the quantities of the items, means for converting the numerical marks together with said special marks into electrical tone signals, means for converting the electrical tone signals into sound tones, means for transmitting the sound tones through the conventional telephone system, means for reconverting the received sound tones into electrical signals, a receiver record, means for applying the electrical signals corresponding to the numerical marks to produce marks on said receiver record, and data processing means for processing said record including means responsive to electrical signals corresponding to the special marks to relate the marks on the receiver record to the items to which they refer.

3. A system according to claim 2 in which the items on the transmitter record are arranged in a vertical column, the numerical columns also being vertical and the rows horizontal, said means for converting the various marks into electrical tone signals including means for scanning the record vertically.

4. A system according to claim 2 in which the means for converting the marks into electrical tone signals comprises means for converting each of the marks at the transmitter, including the special marks, into a tone signal of a different frequency.

5. A system according to claim 2 in which said special marks indicate predetermined positions along the list of items.

6. A system according to claim 2 in which the special marks are marks in code, each representing a separate one of the items.

7. A system according to claim 2, wherein the means for converting the numerical marks at the transmitter together with said special marks into electrical tone signals comprises means for scanning the record to produce electrical pulses in accordance with a decimal notation, and means for coding said electrical pulses into electrical tone signals in accordance with a binary code.

References Cited in the file of this patent

UNITED STATES PATENTS

| | | |
|---|---|---|
| 2,115,563 | Tauschek | Apr. 26, 1938 |
| 2,165,325 | Wilherson | July 11, 1939 |
| 2,186,899 | D'humy | Jan. 9, 1940 |
| 2,274,071 | Kelly | Feb. 24, 1942 |
| 2,294,681 | Moon | Sept. 1, 1942 |